June 22, 1943.  O. STEINER  2,322,734
REFLEX CAMERA WITH GRID SHUTTERS
Original Filed Dec. 4, 1940    4 Sheets-Sheet 1
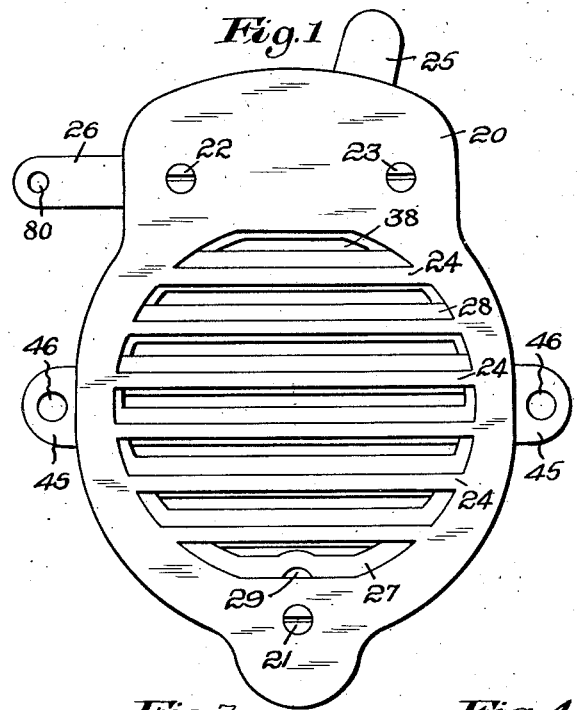
Inventor:
Oscar Steiner:
Attys.

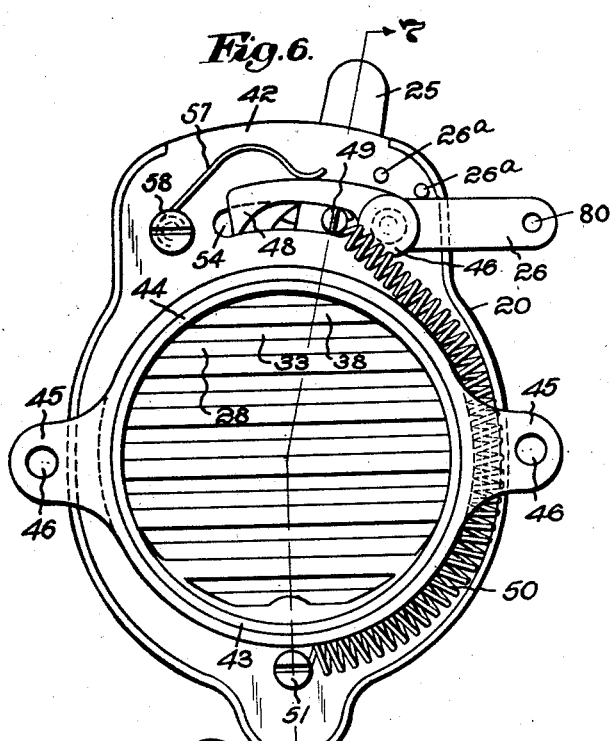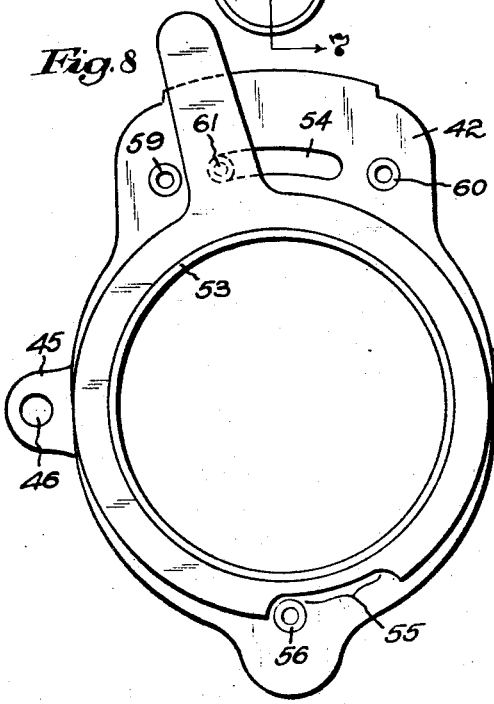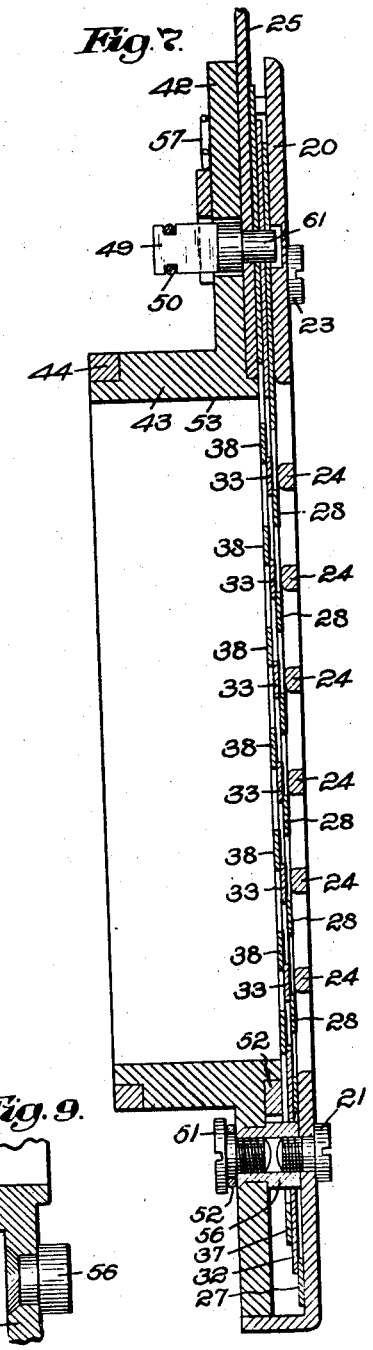

June 22, 1943. O. STEINER 2,322,734
REFLEX CAMERA WITH GRID SHUTTERS
Original Filed Dec. 4, 1940 4 Sheets-Sheet 3

Inventor:
Oscar Steiner,
Attys.

June 22, 1943.   O. STEINER   2,322,734
REFLEX CAMERA WITH GRID SHUTTERS
Original Filed Dec. 4, 1940   4 Sheets-Sheet 4
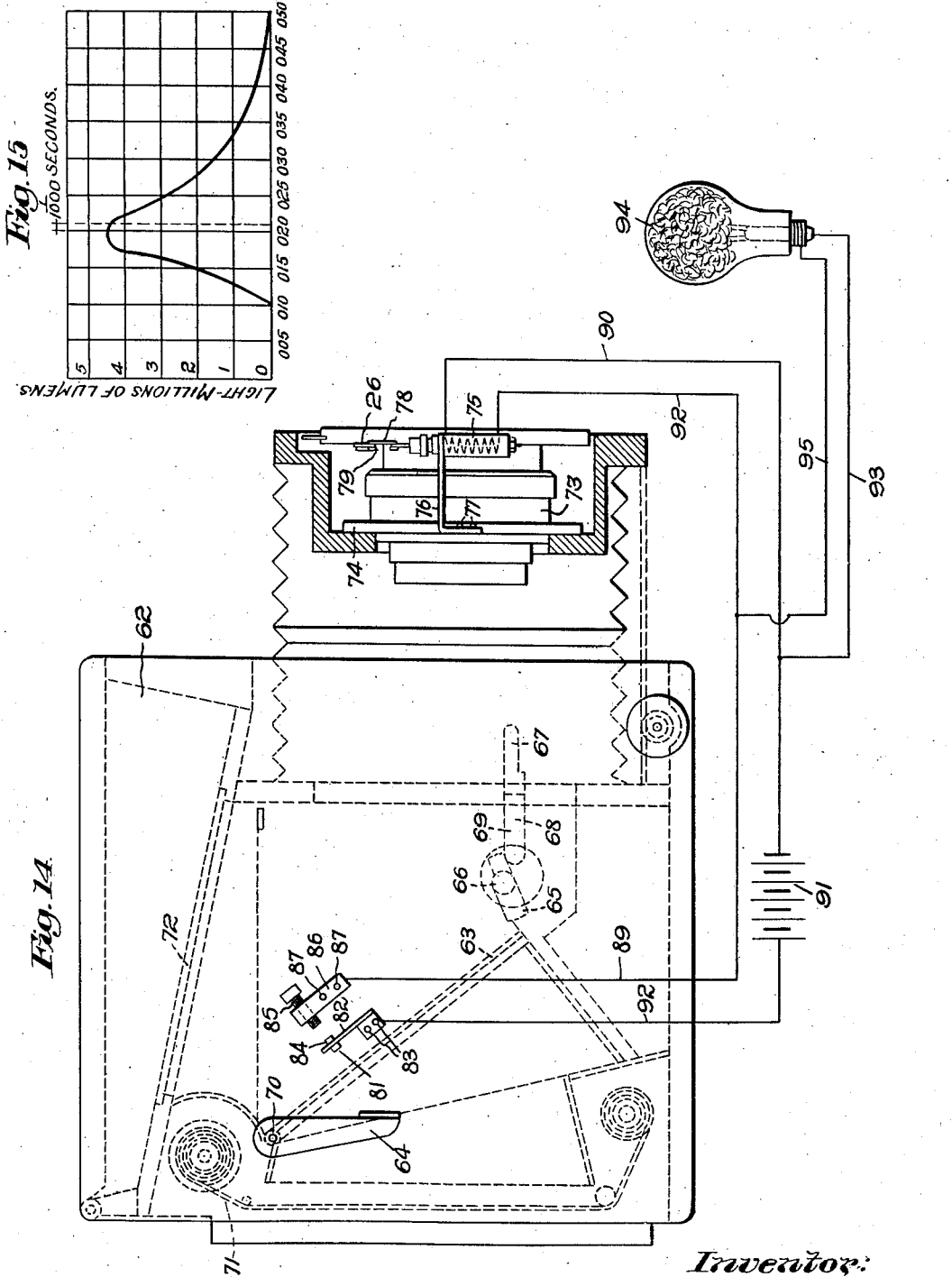

Patented June 22, 1943

2,322,734

UNITED STATES PATENT OFFICE 2,322,734

REFLEX CAMERA WITH GRID SHUTTER

Oscar Steiner, Rochester, N. Y., assignor to The Folmer Graflex Corporation, Rochester, N. Y., a corporation of Delaware Original application December 4, 1940, Serial No. 368,394. Divided and this application June 19, 1941, Serial No. 398,791

6 Claims. (Cl. 95—42)

This application is a division of my co-pending application Ser. No. 368,394, filed December 4, 1940.

This invention relates to reflex cameras with grid shutter.

In order that the principle of the invention may be readily understood, I have disclosed the preferred embodiment of the mechanism of my invention, but to which my invention is not limited.

In the drawings—

Fig. 1 is a front elevation of the grid shutter when in a set condition ready to make an exposure;

Fig. 2 is a diagrammatic plan view of the three grids that make up the grid shutter, when in the closed set condition;

Fig. 3 is a detail in elevation of the front grid;

Fig. 4 is a detail in elevation of the central or stationary grid;

Fig. 5 is a detail in elevation of the back grid;

Fig. 6 is a rear elevation of Fig. 1, showing the latching and tensioning means;

Fig. 7 is a cross section of Fig. 6 on the line 7—7 thereof showing the shutter grids in closed condition;

Fig. 8 is a front elevation of the shutter with the shutter cover plate and the shutter grids removed;

Fig. 9 is a fragmentary detail of the lower grid guide boss;

Fig. 14 is a side elevation, partly in section, showing the application of my invention to a focal plane camera using the mirror for capping the grid shutter; and Fig. 15 is a diagram showing the duration of flash illumination, having indicated thereon the portion of flash used when making an exposure with the grid shutter.

Figure 10:
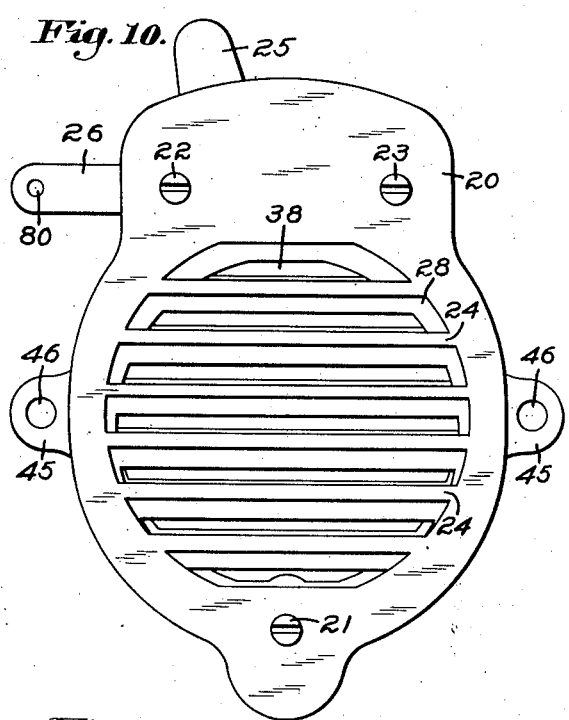
Fig. 10 is a front elevation of the grid shutter shown in closed condition.

Important objects of this invention are to provide a shutter for obtaining very rapid exposures that are of relatively high efficiency; to provide a high-speed shutter having grids that permit an extremely short movement of the masses constituting the shutter grids; to provide a high-speed grid shutter that can be attached to a reflex camera and synchronized therewith, and to provide a shutter that can be synchronized with any of the flash bulbs now manufactured.

This invention relates to new high-speed shutters using movable grids instead of the usual leaves or curtain. There have been numerous attempts to supply a shutter that can be used either as a between-the-lens shutter or a shutter to be attached to a lens barrel, operating either before the lens or behind the lens, to enable the operator to make a very rapid exposure. There are available numerous so-called high-speed shutters, but the highest speed in any shutter other than a focal plane shutter that I have been able to test is operated under $1/400$ of a second. This is not sufficient speed to stop motion in certain types of pictures, as, for instance, the various sports, automobile racing, etc. The focal plane shutter is capable of giving speeds of $1/1000$ of a second and higher, but when using this type of shutter, there is always a displacement or distortion of the image.

Another drawback of the focal plane shutter in high-speed picture making arises when photo-flash bulbs are being used. It is now possible to synchronize certain of the photo-flash bulbs with focal plane shutters to obtain fairly satisfactory results. Nevertheless the said displacement or distortion is maintained, and the flash bulb must have a duration of usable light of around 30 milliseconds. These flash bulbs are sold in rather small quantities and are hard to secure, and the cost is considerably more than of the flash bulb with a shorter light peak.

Another great disadvantage of the focal plane shutter with respect to the shutter herein disclosed is that if a flash bulb has a peak of, say, one million lumens seconds, the focal plane shutter, in making an exposure, uses a very narrow slot when the most rapid speeds are obtained. In a representative focal plane shutter, this slot or opening is approximately $1/8$ of an inch wide, and in a 4 x 5 camera, such slot has to travel four inches. Actually, it only travels $1/8$ of an inch in $1/1000$ of a second, and the flash duration to be available has to be sufficient to allow the apertures to travel entirely across the focal plane of the camera. Thus, if the travel is four inches, and the slot is $1/8$ of an inch, it requires 32 milliseconds for the curtain to travel entirely across the focal plane. This would necessitate a lamp maintaining a sufficiently high illumination for 32 milliseconds, even though an exposure of 1/1000 of a second is being made.

In my present invention, however, if the exposure is 1/1000 of a second, the peak of illumination would only have to be supplied in excess of one millisecond. It is a well known fact in the manufacture of flash bulbs that either a long duration of flash with a fairly low peak, or a very high peak of illumination of very short duration is possible. The great majority of lamps that are manufactured today have a rather short peak lasting from five to eight milliseconds. Such a lamp has become the standard and it is readily obtainable on the market at a very low price.

In the use of my invention, employing a grid shutter, a maximum shutter opening of 60 per cent can easily be obtained, by reason of the employment of three grid plates in face-to-face relation (one of which is preferably stationary and the other two of which are preferably moved simultaneously in opposite directions), the bars of which plates are all flat and of substantially the same cross dimension, being very materially less than the cross width of each of the spaces of the plate, so that when the flat bars of all three grid plates are superposed, they do not, in the disclosed embodiment of the invention, obstruct as much as one-half of the total area within the rim of each grid plate, as will be evident from the figures of the drawings, and particularly Figs. 3, 4, 5 and 7. Therefore, I can make use of 50 per cent of the light produced by a photo-flash bulb during its peak, whereas in the focal plane shutter, even with the long duration type of flash bulb, when making an exposure of 1/1000 of a second, the aperture only moves 1/32 of the distance across the focal plane. It is impossible in such case ever to obtain an efficiency in the use of the illumination greater than 10 per cent.

I will now describe the preferred embodiment of the mechanism of my invention involving a grid structure. In said embodiment thereof shown in Figs. 1 to 14, the grid shutter is adapted to be attached to any lens mount, and the focal plane shutter or the mirror of a reflex camera may be employed for capping the grid shutter.

Referring first to Figs. 1 to 5, wherein the parts are shown of the high-speed grid shutter that is particularly adapted to be attached to the lens barrel of the camera either in front or in back of the lens board therefor, the outer cover of the shutter is indicated at 20, it being attached to the shutter frame by means of screws 21, 22, 23. The said cover 20 is provided with a central opening having a grid formation extending thereacross composed of grid bars 24, 24. The purpose thereof is to protect the operating grid plates or leaves of the grid shutter. The grid shutter itself is provided with a setting or reset lever 25, the purpose whereof is to cock or set the shutter grid plates or leaves prior to an exposure. The grid shutter is released by means of a release lever 26, thereby permitting the shutter grid plates or leaves to move in their functioning operations.

In Fig. 2, there are represented the three shutter grid plates or grid leaves superimposed upon each other, so that the various grid bars thereof overlap and exclude all light from the lens. The front grid plate or leaf is represented at 27. While it may be of any suitable material, it is preferably a very thin sheet metal, desirably beryllium copper having a large central opening crossed by grid bars 28, 28, and having elongated slots 29 and 30, 30, for guiding the said grid plate or leaf. Between the said slots 30, 30 is a transversely extending slot 31 which is of substantially an inverted or reversed "S" formation, and forming a cam or cam path for operating the said shutter plate or leaf 27. Underlying the said front grid plate or leaf 27 is an intermediate or central stationary grid plate or leaf 32, shown separately in Fig. 4, and having grid bars 33, 33 and mounting holes 34 and 35, 35. Between the mounting holes 35, 35 is an arcuate slot 36 transversely extending and providing clearance for the operating pin, to be described. Underlying the said central stationary grid plate or leaf is the back grid plate or leaf 37, separately shown in Fig. 5, and having grid bars 38, 38, an elongated bottom slot 39 and, at the top, two elongated slots 40, 40 between which latter is a transversely extending cam or cam path formed as a slot of substantially S-shape similar to the slot 31, but oppositely disposed.

Referring to Figs. 6, 7 and 8, wherein certain of the parts are shown, the shutter mounting or back plate is shown at 42, it having a centrally extending tubular portion or barrel 43 to which is attached a mounting flange 44 having mounting ears 45, 45 and mounting holes 46, 46. Also fitted to the said shutter mounting or back plate 42 is the shutter release lever 26 secured to said plate by a shoulder screw 47. On the opposite end of the said release lever 26 is provided in any suitable way a release dog 48, the purpose of which is to engage and hold a shutter release pin 49 of the shutter setting or reset lever 25. Attached to the said shutter release pin 49 is a coiled spring 50 wrapped partially about the shutter barrel 43 and held in position by means of a shoulder screw 51 threaded into the shutter mounting or back plate 42. The said coiled spring 50 tends to move the shutter release pin 49 in a clockwise direction, viewing Fig. 6. The shutter setting or reset lever 25 is connected to a shutter setting ring 52, best shown in Fig. 8, said shutter setting ring being fitted to a cylindrical projection 53 of the shutter barrel 43, as most clearly shown in Figs. 7 and 8. The said shutter mounting or back plate 42 has, as best shown in Fig. 8, an arcuate slot 54 for the passage of the shutter release pin 49. The said shutter setting ring 52, as shown in Fig. 8, is provided with a cut-away segment 55 for engaging a bushing 56 of the shutter mounting or back plate 42, thus limiting the movement of the said shutter setting ring 52.

Inasmuch as the shutter release pin 49 is caused to turn in a clockwise direction by the coiled spring 50, viewing Fig. 6, when the setting or reset lever 25 is moved in a contraclockwise direction, the said shutter release pin 49 will be engaged by the dog 48, thus holding said setting or reset lever 25 in that position until released by the release lever 26. The said dog 48 is caused to be turned in a contraclockwise direction for engagement with the shutter release pin 49 when in the set condition by a spring 57, shown in Figs. 6 and 7 as secured to the shutter mounting or back plate 42 by a screw 58. The movement of the said shutter release lever 26 is limited by stop pins 26a, 26a, which are attached as shown in Fig. 6, to the shutter mounting or back plate 42. Also attached to the front face of the said plate 42 are guide bushings 59 and 60 shown in Fig. 8.

Figure 11:
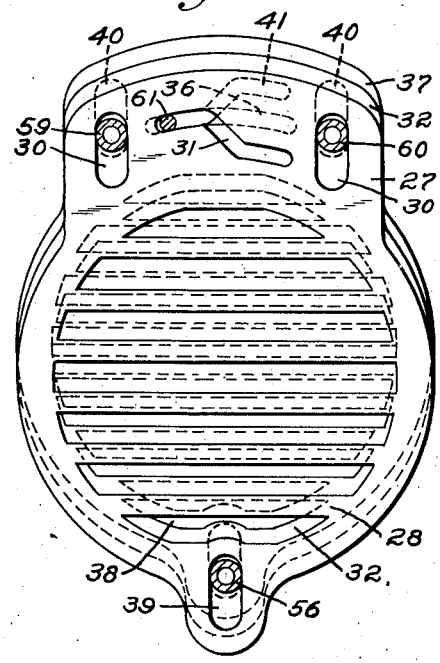
Fig. 11 is a diagrammatic view of the shutter grids when the shutter is in a released or run-down condition, as in Fig. 10.

Referring particularly to Fig. 7, the said shutter release pin 49 extends through the slot 54 and is anchored to the shutter setting or reset lever 25 and projects therebeyond as a cylindrical finger 61, passing through the cam slot or path 31 of the front grid plate or leaf 27, through the clearance provided by the slot 36 of the central stationary grid plate or leaf 32 and through the cam path or formation 41 of the back shutter grid plate or leaf 37. The slot 29 of the shutter grid plate or leaf 27, the hole 34 of the shutter grid plate or leaf 32, and the opening 39 of the shutter grid plate or leaf 37, are all placed over the guide stud or bushing 56, shown upon an enlarged scale in Figs. 7 and 9. The said stud or bushing 56 is shown upon an enlarged scale in Figs. 7 and 9. The said stud or bushing 56 serves also as a spacer between the shutter mounting or back plate 42 and the shutter outer cover 20. The elongated openings 30, 30 of the grid plate or leaf 27, the holes 35, 35 of the shutter grid plate or leaf 32 and the elongated openings 40, 40 of the grid plate or leaf 37 are all placed over the guide studs 59, 60, respectively, and are so relatively positioned that the finger or operating pin 61 passes through the cam formation or path 31 of the grid plate or leaf 27, through the clearance opening 36 of the stationary grid plate or leaf 32 and through the cam formation or path 41 of the grid plate or leaf 37. As the shutter setting or reset lever 25 is in its released position, the several shutter grid plates or leaves are positioned as shown in Fig. 7 and also in Fig. 11, wherein the front grid plate or leaf 27 is shown as having been moved downwardly under the influence of the operating pin 61 and the cam formation or path 31. The shutter grid plate or leaf 32, however, always remains fixed, being mounted in a stationary position, and the shutter grid plate or leaf 37 will have been moved upwardly under the influence of the operating pin 61 and the cam formation or path 41, so that the several grid plates or leaves are positioned as shown in Figs. 7, 10 and 11.

If, now, the shutter setting or reset lever 25 is moved in a clockwise direction viewing Fig. 1, the movable grid plates or leaves will be moved to the position shown in Fig. 2. wherein the grid plate or leaf 27 is shown as moved upwardly under the influence of the operating pin 61 and of the cam formation or path 31. The central shutter plate or leaf 32, of course, remains stationary, and the back grid plate or leaf 37 will be moved downwardly into the position shown in Figs. 1 and 2.

When the shutter setting or reset lever 25 has been moved in a clockwise direction to the position shown in Fig. 1, the shutter release pin 49 will be engaged by the dog 48 of the release lever 26, and the several grid plates or leaves will be in the position shown in Fig. 2. The said cylindrical operating pin 61, which extends through the cam formations or paths 31 and 41 and the clearance slot 36, will also be in the position shown in Fig. 2. When the shutter release lever 26 is pressed, thereby releasing the shutter release pin 49, the shutter setting or reset lever 25 will be moved in a contraclockwise direction, viewing Fig. 1, or in a clockwise direction viewing Fig. 6, through the instrumentality of the coiled spring 50.

Inasmuch as the operating pin 61 is attached to the setting or reset lever 25, the said operating pin 61 will be caused to travel with the setting or reset lever 25, namely, in a contraclockwise direction viewing Fig. 2, when the shutter release lever 26 has been depressed. When the said operating pin 61 reaches the position shown in Fig. 13, the grid plate or leaf 27 will be moved downward until the openings therein coincide with the openings in the grid plate or leaf 32, and the grid plate or leaf 37 will be moved upwardly until the openings therein coincide with the openings in the grid plate or leaves 27 and 32. The grid shutter will then be in the full open position or condition shown in Fig. 12, thereby admitting more light than is cut off by the grid bars, as is evident from said figure, the grid plates or leaves thereof being positioned as shown in Fig. 13, and the shutter setting or reset lever 25 will also be in the position shown in Fig. 12.

Figure 12:
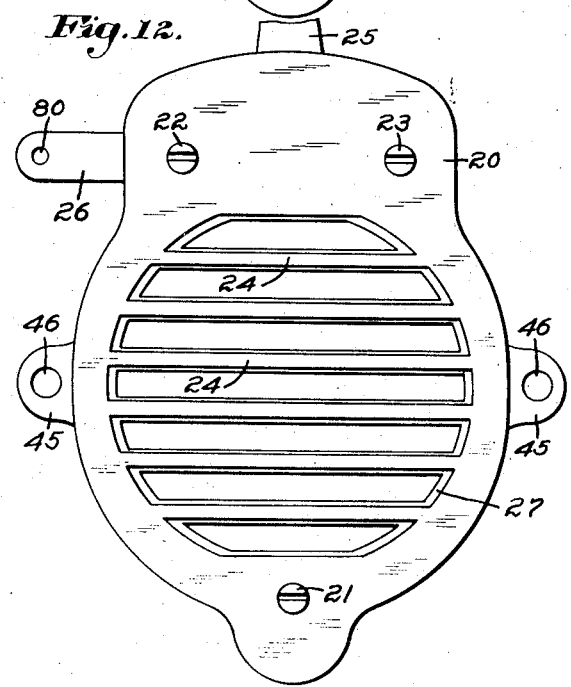
Fig. 12 is a front elevation of the shutter, the shutter having been released, and the grids having reached a position wherein the shutter is open.
Figure 13:
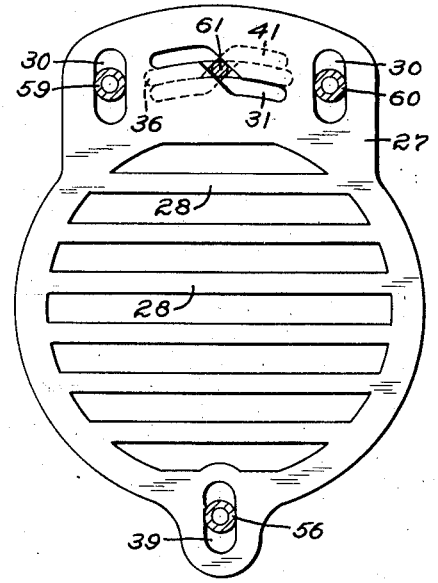
Fig. 13 is a diagrammatic view of the shutter grids when in the condition shown in Fig. 12.

As the said setting or reset lever 25 and the operating pin 61 continue to travel in a contraclockwise direction, viewing Fig. 12, until the position shown in Fig. 10 is reached, the said operating pin 61 will have reached the position shown in Fig. 11, wherein the grid plate or leaf 27 is shown as moved all the way down, and the grid plate or leaf 37 moved all the way up, thus completing the exposure. As the shutter setting or reset lever 25 is moved in a clockwise direction, viewing Fig. 1, carrying with it the operating finger 61, the grid plates or leaves will be caused to be moved to the position shown in Fig. 2. That is to say, the grid plate or leaf 27 will be moved all the way up and the grid plate or leaf 37 will be moved all the way down, thus again closing the grid shutter, but restoring it to the set condition in which the operating pin 61 will be in the position shown in Fig. 2 and the release pin 49 will be engaged by the dog 48, ready for a second exposure.

The grid shutter just described and constituting the preferred embodiment of my invention, is an attachment adapted to be placed on the lens barrel of a photographic lens and to be held thereto by screws (not shown) passing through the holes 46, 46 of the lugs 45, 45 into the usual lens board of the camera. If no other shutter is used in the camera, it would be necessary to put the dark slide in the plate holder when the grid shutter is reset for a second exposure.

The grid shutter herein disclosed, however, is particularly well adapted to be used on a reflex type of camera, especially when taking photoflash exposures, as the mirror of the said camera will then serve as a capping means when resetting the grid shutter and the grid shutter can be actuated or released for exposure by any well known or suitable means, such as by the use of the magnet of a synchronizer tripper that is disclosed in my co-pending application Ser. No. 346,395, filed July 19, 1940, and an electrical contact can be made when the pivoted mirror of the camera reaches a point close to the end of its travel in an upward direction.

Such manner of operation and such construction, arrangement and relation of parts are indicated and shown in Fig. 14, wherein the casing or frame of a reflex camera of the well known Graflex type is indicated at 62, it having a pivoted mirror 63, a mirror reset arm or lever 64, a mirror holding latch 65 supported on a shoulder screw 66, a mirror release lever 67 having fast therewith a shaft 68 suitably mounted in the casing of the camera, and a second lever 69 fast on the shaft 68. When the mirror release lever 67 is depressed, the shaft 68 is turned thereby in a clockwise direction, carrying with it the said second lever 69 which engages one end of the mirror holding latch 65, causing it to turn in a contraclockwise direction, thereby releasing the pivoted mirror 63, shown as mounted fast for rocking movement upon a shaft 70, thus causing said mirror to swing upwardly under the influence of a spring (not shown), but well known in the art. As the said mirror 63 swings upwardly, turning the shaft 70, the mirror reset arm or lever 64 will be caused to turn in a contraclockwise direction, and when said mirror reaches the end of its upward travel, the shutter curtain 71 will be released and allowed to run down. The structure of such shutter curtain and its manner of operation are well known in the art.

When preparing the camera for an exposure, the said shutter curtain 71 is wound to the "open" condition, indicated on the shutter speed dial by the letter "O," the mirror having been previously reset. While the shutter curtain 71 is in the "open" condition, light cannot reach the sensitized material inasmuch as the mirror 63 intercepts any light coming through the object lens, and deflects it to the usual focusing screen or ground glass 72. The said reflex camera is equipped with the usual lens barrel 73 and lens board 74, and to the forward portion of the said lens barrel 73 there is attached the grid shutter of the said disclosed embodiment of my invention. There is also attached to the lens board 74 a magnetic tripper 75 by means of a bracket 76 secured to the lens board by screw 77. The said magnetic tripper has a connecting link 78 secured to the shutter release lever 26 by means of a shoulder screw 79, shown in Fig. 14 as passing through a hole 80 therein (that is shown in Figs. 1, 6, 10 and 12) in the said release lever 26.

In order to make an exposure, the shutter setting or reset lever 25 is turned in a clockwise direction to the position shown in Fig. 1, the mirror 63 having been previously set in the position shown in Fig. 14 and the shutter curtain 71 being moved or adjusted to the "open" position. When the said mirror release lever 67 is released, thus releasing the mirror 63, the latter swings upwardly, turning the shaft 70 and the mirror reset arm or lever 64, which latter will engage the insulating button 81 of the contact arm 82, shown in Fig. 14 as attached to the camera casing 62 by wood screws 83, 83, thus causing the contact or terminal 84 to engage the contact or terminal screw 85 threaded into a contact screw supporting member 86 secured to the camera casing 62 by wood screws 87, 87, thus completing a circuit through the wire 89 attached to the contact screw supporting member or block 86, the magnetic tripper 75, the wire 90, the battery 91, the wire 92 and the contact arm 82. Attached to the wire 90 is a wire 93 connected to one terminal of the flash bulb 94, and to the wire 89 is connected a wire 95 that is itself connected to the other terminal of the flash bulb 94.

In the said embodiment of my invention and the particular use thereof in a camera of the reflex type, I have disclosed very simple but accurately functioning means for completing the circuit through a magnetic tripper for the purpose of actuating the movable parts or elements of the grid shutter. It will be apparent, however, that within the scope and purpose of my invention, the grid shutter may be actuated in a great many different ways. For example, the electrical contacting mechanism shown in the patent to Torkel Korling, No. 2,029,238, dated January 28, 1936, may be used. Also, within the scope and purpose of my invention, as alternative means I control the movable elements of the grid shutter by a mechanical connection extending from and between the mirror 63 and the grid shutter release lever 26, using therefor the connecting mechanism disclosed in my co-pending application Ser. No. 313,534, filed January 12, 1940, patented April 1, 1941, No. 2,236,925.

I will now give a brief summary of the operation of my invention when using the same in a camera of the reflex type, its use in other types of cameras, such as the Graphic camera, being evident from the foregoing description.

The mirror 63 thereof, shown in Fig. 14, is set in the position there shown by a clockwise movement of the mirror reset arm or lever 64, and the shutter curtain 71 is positioned in the "open" condition, which will be indicated by the letter "O" disclosed in the opening of the shutter plate. The grid shutter itself is set or cocked by moving the setting or reset lever 25 to the right, viewing Fig. 1. A flash bulb is placed in circuit in the usual socket provided for the purpose, and the reflex camera is now ready for making an exposure. The said camera will be focused in the usual manner and the mirror release lever 67 depressed, releasing the mirror 63 and allowing it to swing upward. At, or nearly at, the limit of upward travel of the said mirror 63, contact will be made between the terminal 84 and the terminal screw 85, closing the circuit through the magnetic tripper 75, which will cause a release of the movable element of the grid shutter through the agency of the release lever 26, and at the same time the photo-flash lamp 94 will be ignited. At the time the contacts 84 and 85 are closed, the shutter curtain 71 is released and thereby allowed to run down, thus capping the sensitized material located in the usual holder. Inasmuch as it is necessary to reset the mirror 63 before the shutter curtain 71 can be then rewound, a definite cycle of operations must take place, as the structure of the Graflex camera requires the same. However, the grid shutter itself can be reset either before or after the mirror 63 has been restored to viewing position, and the shutter curtain 71 has been rewound to the "open" condition, viewing Fig. 14, because the sensitized material positioned in the camera will be capped either by said mirror 63 or by an opaque portion of the shutter surface 71.

Thus, I have, among other things, described one use of the grid shutter of my invention in such a way as to secure a type of exposure not possible prior to my invention.

In describing the said embodiment of my invention herein shown, I have referred to three grid plates or leaves, one of which is stationary and two of which are movable. Within the broad scope and purpose of my invention, other number of shutter grid plates or leaves may be employed, but a two-grid plate or leaf obviously functions with less efficiency than a three-grid plate or leaf, because admitting only fifty per cent of the light, and if a greater number of grid plates or leaves than three be provided, the grid bars thereof would necessarily be of such flimsy or delicate character as to render their use less desirable than the use of three grid plates or leaves which I have found in actual tests to prove entirely satisfactory.

The grid bars of the several grid plates or leaves may be arranged either upright or horizontal, or at any angle therebetween, within the scope of my invention. I have shown the grid bars horizontal in the disclosed embodiment of my invention. While I have shown one of the grid plates or leaves as always stationary, I may for some purposes, within the broad scope of my invention, make all the grid plates or leaves movable, as by entirely omitting the stationary leaf or plate, or moving it to and fro in substantially the same manner as in the herein shown movable plates or leaves. I prefer, however, to employ a stationary grid plate or leaf as herein disclosed, without limiting myself thereto.

I have referred in the specification to the opening of the shutter in synchronization with the peak of the flash of the photo-flash lamp or bulb. I have in Fig. 15 diagrammatically indicated the light curve produced by a photo-flash lamp. I have plotted on the said curve the grid shutter opening of 1/1000 second. The said diagram clearly indicates how the grid shutter herein disclosed makes possible the greatest amount of light passage to the lens of the camera at a speed of 1/1000 second.

In the said embodiment of my invention, I have disclosed means for practising a new art of high-speed photography, as by its use photographs can be made when using the ordinary commercial and readily available photo-flash lamps to obtain speeds of 1/1500 second, and at the same time securing fully timed negatives. I believe that I am the first to provide a camera shutter working near the nodal point of the lens to obtain speed anywhere near such value.

Having thus described one embodiment of my invention, I desire it to be understood that although specific terms are employed, they are used in a generic and descriptive sense and not for purposes of limitation, the scope of the invention being set forth in the following claims.

I claim:

1. A camera of the reflex type having a pivoted mirror swingable from focusing position to picture-taking position, and having a lens barrel with an objective lens in advance of said mirror; an exposure grid shutter at said lens barrel providing in excess of fifty per cent shutter opening, and for that purpose consisting of a stationary grid plate having a plurality of parallel, flat bars and intervening, parallel, elongated, unobstructed openings, and of two oppositely movable grid plates with bars and openings like those of said stationary plate, all said plates occupying a face-to-face relation, the cross sectional dimension of all of the said bars of each such plate being less than the cross sectional dimension of all said openings of such plate, and such dimension of each bar being less than such dimension of the adjacent opening at either side thereof, thereby to admit sufficient light past the lens, for photographic purposes, the said mirror acting as a capping means for the said grid shutter during the resetting thereof; mirror release means; and means operatively connecting said mirror and the said two movable grid plates to move said two grid plates simultaneously in directions transverse to their bars substantially simultaneously with the movement of the released mirror from focusing to picture-taking position, thereby bringing all the bars and all the openings respectively of said grid plates into superposed relation.

2. A camera of the reflex type having a pivoted mirror swingable from focusing position to picture-taking position, and having a lens barrel with an objective lense in advance of said mirror; an exposure grid shutter at said lens barrel providing in excess of fifty per cent shutter opening, and for that purpose consisting of a stationary grid plate having a plurality of parallel, flat bars and intervening, parallel, elongated, unobstructed openings, and of two oppositely movable grid plates with bars and openings like those of said stationary plate, all said plates occupying a face-to-face relation, the cross sectional dimension of all of the said bars of each such plate being less than the cross sectional dimension of all said openings of such plate, and such dimension of each bar being less than such dimension of the adjacent opening at either side thereof, thereby to admit sufficient light past the lens, for photographic purposes, the said mirror acting as a capping means for the said grid shutter during the resetting thereof; mirror release means; and means operatively connecting said mirror and the said two movable grid plates to move said two grid plates simultaneously in directions transverse to their bars substantially simultaneously with the movement of the released mirror from focusing to picture-taking position, thereby bringing all the bars and all the openings respectively of said grid plates into superposed relation, said means connecting the mirror and the movable grid plates including an electric circuit having said movable mirror therein, and also having therein an operator connected to said movable grid plates, whereby the closing of said circuit by the release of said mirror operates said grid shutter.

3. A camera of the reflex type having a pivoted mirror swingable from focusing position to picture-taking position, and having a lens barrel with an objective lens in advance of said mirror; an exposure grid shutter at said lens barrel providing in excess of fifty per cent shutter opening, and for that purpose consisting of a stationary grid plate having a plurality of parallel, flat bars and intervening, parallel, elongated, unobstructed openings, and of two oppositely movable grid plates with bars and openings like those of said stationary plate, all said plates occupying a face-to-face relation, the cross sectional dimension of all of the said bars of each such plate being less than the cross sectional dimension of all said openings of such plate, and such dimension of each bar being less than such dimension of the adjacent opening at either side thereof, thereby to admit sufficient light past the lens for photographic purposes, the said mirror acting as a capping means for the said grid shutter during the resetting thereof; mirror release means; and means operatively connecting said mirror and the said two movable grid plates to move said two grid plates simultaneously in directions transverse to their bars substantially simultaneously with the movement of the released mirror from focusing to picture-taking position, thereby bringing all the bars and all the openings respectively of said grid plates into superposed relation, said means connecting the mirror and the movable grid plates including an electric circuit having said mirror therein, said circuit being adapted to be closed by the release movement of the said mirror, and a magnetic tripper also in said circuit and adapted to be energized by the closing of said circuit and thereupon to release the said grid shutter to make the exposure.

4. A camera of the reflex type having a pivoted mirror swingable from focusing position to picture-taking position, and having a lens barrel with an objective lens in advance of said mirror; an exposure grid shutter at said lens barrel providing in excess of fifty per cent shutter opening, and for that purpose consisting of a stationary grid plate having a plurality of parallel, flat bars and intervening, parallel, elongated, unobstructed openings, and of two oppositely movable grid plates with bars and openings like those of said stationary plate, all said plates occupying a face-to-face relation, the cross sectional dimension of all of the said bars of each such plate being less than the cross sectional dimension of all said openings of such plate, and such dimension of each bar being less than such dimension of the adjacent opening at either side thereof, thereby to admit sufficient light past the lens for photographic purposes, the said mirror acting as a capping means for the said grid shutter during the resetting thereof; mirror release means; and means operatively connecting said mirror and the said two movable grid plates to move said two grid plates simultaneously in directions transverse to their bars substantially simultaneously with the movement of the released mirror from focusing to picture-taking position, thereby bringing all the bars and all the openings respectively of said grid plates into superposed relation, the said camera having a shutter curtain constructed and arranged to be released by the mirror when itself released from focusing position, whereby said shutter curtain may act as a capping means to said grid shutter when being reset.

5. A camera of the reflex type having a pivoted mirror swingable from focusing position to picture-taking position, and having a lens barrel with an objective lens in advance of said mirror; an exposure grid shutter at said lens barrel providing in excess of fifty per cent shutter opening, and for that purpose consisting of a stationary grid plate having a plurality of parallel, flat bars and intervening, parallel, elongated, unobstructed openings, and of two oppositely movable grid plates with bars and openings like those of said stationary plate, all said plates occupying a face-to-face relation, the cross sectional dimension of all of the said bars of each such plate being less than the cross sectional dimension of all said openings of such plate, and such dimension of each bar being less than such dimension of the adjacent opening at either side thereof, thereby to admit sufficient light past the lens for photographic purposes, the said mirror acting as a capping means for the said grid shutter during the resetting thereof; mirror release means; and means operatively connecting said mirror and the said two movable grid plates to move said two grid plates simultaneously in directions transverse to their bars substantially simultaneously with the movement of the released mirror from focusing to picture-taking position, thereby bringing all the bars and all the openings respectively of said grid plates into superposed relation, said means connecting the mirror and the movable grid plates including an electric circuit having said movable mirror therein, said electric circuit also having therein an actuating device acted upon by the closing of said circuit to operate said grid shutter to effect the exposure, said electric circuit also having therein a flashlamp to be ignited by the closing of said circuit.

6. A camera of the reflex type having a pivoted mirror swingable from focusing position to picture-taking position, and having a lens barrel with an objective lens in advance of said mirror, and an exposure grid shutter at said lens barrel, consisting of a stationary grid plate having a plurality of parallel, flat bars and intervening, parallel, elongated, unobstructed openings and of two oppositely movable grid plates with flat bars and openings like those of said stationary grid plate, all of said grid plates occupying a face-to-face relation, the cross sectional dimension of all said bars of each of said plates being less than the cross sectional dimension of all the openings thereof, thereby admitting more light than is cut off by the grid bars; the said mirror acting as a capping means for the said grid shutter during the resetting thereof; mirror release means; and means operatively connecting said mirror and the said two movable grid plates, to move said two grid plates simultaneously in directions transverse to their bars substantially simultaneously with the movement of the released mirror from focusing to picture-taking position.

OSCAR STEINER.